May 28, 1963
P. GIUFFRIDA ETAL
3,091,724
FLAME DETECTION CIRCUIT
Filed March 8, 1960
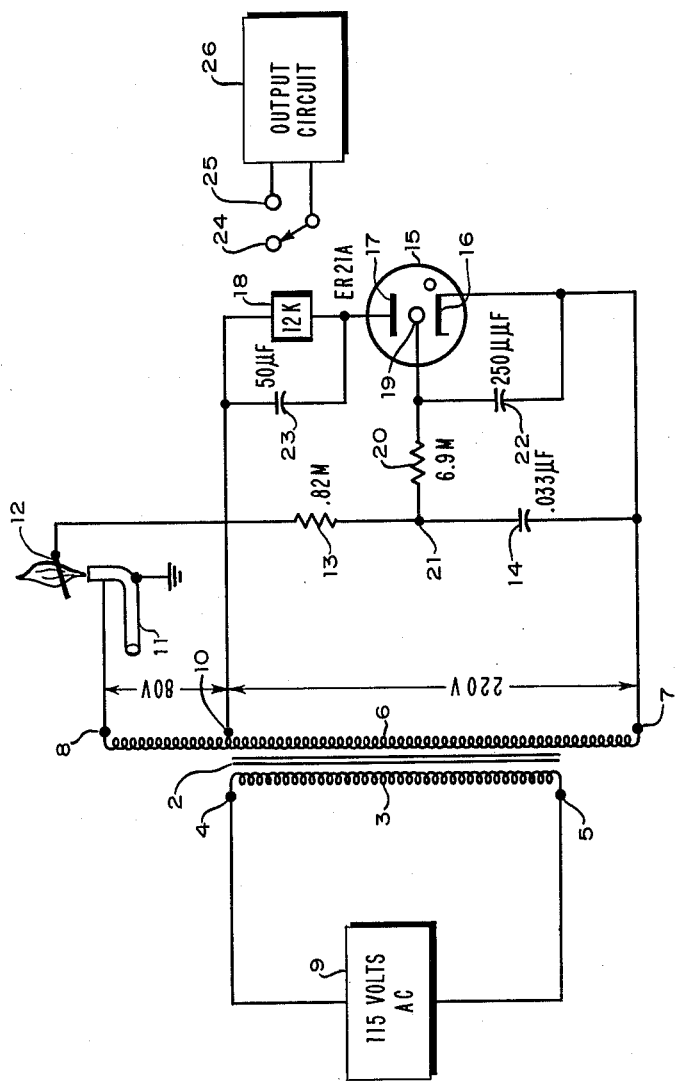
INVENTORS
P. GIUFFRIDA
J. PRATT
BY *(signature)*
ATTORNEY

3,091,724
FLAME DETECTION CIRCUIT
Philip Giuffrida, North Andover, and John Pratt, South Braintree, Mass., assignors to Electronics Corporation of America, Cambridge, Mass., a corporation of Massachusetts
Filed Mar. 8, 1960, Ser. No. 13,604
3 Claims. (Cl. 317—149)

This invention relates to electronic flame detection circuits such as are used in combustion control devices for furnaces.

The main object of this invention is to provide a simple electronic flame detector requiring no warm-up time.

Other and incidental objects of this invention will be apparent to those skilled in the art from a reading of this specification and an inspection of the accompanying drawing which is a circuit diagram showing a flame detection circuit in accordance with this invention.

Referring now to the drawing, we have a transformer 2 having a primary winding 3 between terminals 4 and 5 and a secondary winding 6 between terminals 7 and 8. The primary winding 3 is connected across a source 9 of 115-volts alternating current. The secondary winding is tapped at point 10 so that the voltage across terminal 7 and point 10 is 220 volts and that across terminal 8 and point 10 is 80 volts. Terminal 8 is grounded, for instance through the furnace fuel supply pipe 11. A flame electrode 12 is connected to terminal 7 through resistor 13 and capacitor 14. A three-element glow discharge trigger tube 15 has its cathode 16 connected to terminal 7 and its anode 17 connected to point 10 through relay coil 18. A resistor 20 connects the starter electrode 19 of tube 15 to the junction 21 of resistor 13 and capacitor 14; and a capacitor 22 shunts the two electrodes 16 and 19. A large capacitor 23 shunts relay coil 18. Relay coil 18 controls contacts 24 and 25 of output circuit 26.

The operation of the flame detection circuit shown in the drawing is as follows: in the absence of a flame there is no conduction between the terminal 8 and the flame electrode 12. The potential across the anode 17 and the cathode 16 of tube 15 is not sufficient to start conduction through tube 15. When a flame bridges the gap between the pipe 11 and the electrode 12, current flows unilaterally from electrode 12 to terminal 8. This unilateral current flow, due to the well known rectifying property of flames, charges the capacitor 14 so that the potential at junction 21 rises in a negative direction. This causes capacitor 22 to charge slowly through resistor 20, thereby raising the potential at the starter electrode 19. When this potential is sufficiently high the tube 15 conducts during those portions of the alternating current cycle when the anode 17 is positive with respect to cathode 16. The tube 15 ceases to conduct during the next half-cycle but is re-ignited again during the following and alternate half-cycles as long as the flame conduction continues to accumulate a negative charge at the junction 21. With proper choice of circuit parameters, the current through the tube 15 may be sufficient to keep relay contacts 24 and 25 closed as long as a flame bridges the gap between pipe 11 and electrode 12. When the flame stops, the capacitor 14 discharges and tube 15 cease to conduct, thus opening relay contacts 24 and 25. It is worth noting that if pipe 11 and electrode 12 are accidentally shorted, the resulting bilateral conduction will not charge capacitor 14 in a negative direction so as to cause tube 15 to conduct. Further, the glow discharge tube of this circuit needs no warm-up time to make the circuit operative. It should be noted also that the flame electrode 12 may be replaced by another device which conducts unilaterally in the presence of a flame, such as a photocell of the photoemissive type.

We claim:

1. A flame detection circuit comprising a transformer having primary and secondary windings, said secondary winding having first and second outer terminals and a tap, a glow discharge trigger tube having an anode, a cathode, and a starter electrode, means to connect the cathode of said tube to the first outer terminal of said transformer, means including a relay coil to connect the anode of said tube to said transformer tap, a capacitor having two terminals, means to connect one terminal of said capacitor to the first outer terminal of said transformer, a device which conducts unilaterally in the presence of a flame, means including a resistance to connect said device between the other terminal of said capacitor and the second outer terminal of said transformer and with such polarity that in the presence of flame there is a net flow of electrons from the second outer terminal of said transformer to the other terminal of said capacitor, a resistance connected between the other terminal of said capacitor and said starter electrode and a capacitor connected between said starter electrode and said cathode.

2. A flame detection circuit comprising a transformer having primary and secondary windings, said secondary winding having first and second outer terminals and a tap, a glow discharge trigger tube having an anode, a cathode, and a starter electrode, means to connect the cathode of said tube to the first outer terminal of said transformer, means including a relay coil to connect the anode of said tube to said transformer tap, a capacitor having two terminals, means to connect one terminal of said capacitor to the first outer terminal of said transformer, a flame electrode, means including a resistance to connect said flame electrode between the other terminal of said capacitor and the second outer terminal of said transformer and with such polarity that in the presence of flame there is a net flow of electrons from the second outer terminal of said transformer to the other terminal of said capacitor, a resistance connected between the other terminal of said capacitor and said starter electrode and a capacitor connected between said starter electrode and said cathode.

3. A flame detection circuit comprising an alternating current source having first and second outer terminals and a tap, a glow discharge trigger tube having an anode, a cathode, and a starter electrode, means to connect the cathode of said tube to the first outer terminal of said source, means including a relay coil to connect the anode of said tube to said tap, a capacitor having two terminals, means to connect one terminal of said capacitor to the first outer terminal of said source, a device which conducts unilaterally in the presence of a flame, means including a resistance to connect said device between the other terminal of said capacitor and the second outer terminal of said source and with such polarity that in the presence of flame there is a net flow of electrons from the second outer terminal of said source to the other terminal of said capacitor, a resistance connected between the other terminal of said capacitor and said starter electrode and a capacitor connected between said starter electrode and said cathode.

References Cited in the file of this patent

UNITED STATES PATENTS

| | | |
|---|---|---|
| 2,112,736 | Cockrell | Mar. 29, 1938 |
| 2,343,001 | Cohen | Feb. 29, 1944 |
| 2,352,240 | Wolfner | June 27, 1944 |
| 2,360,532 | Yates | Oct. 17, 1944 |
| 2,870,329 | Aubert | Jan. 10, 1959 |
| 2,971,136 | Meili | Feb. 7, 1961 |

OTHER REFERENCES

Gray: "Applied Electronics," 2nd edition, by Wiley, 1954, pp. 378–382.